(12) United States Patent
Saito et al.

(10) Patent No.: US 6,514,091 B2
(45) Date of Patent: *Feb. 4, 2003

(54) ELECTRICAL JUNCTION BOX FOR A VEHICLE

(75) Inventors: Yukitaka Saito, Yokkaichi (JP); Nobuchika Kobayashi, Yokkaichi (JP); Koji Kasai, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/993,559

(22) Filed: Nov. 27, 2001

(65) Prior Publication Data

US 2002/0064975 A1 May 30, 2002

(30) Foreign Application Priority Data

Nov. 28, 2000 (JP) ........................................ 2000-361263
Dec. 12, 2000 (JP) ........................................ 2000-377125
Dec. 12, 2000 (JP) ........................................ 2000-377476

(51) Int. Cl.$^7$ .............................................. H01R 12/00
(52) U.S. Cl. ..................... 439/76.2; 439/949; 439/76.1; 439/65
(58) Field of Search ............................... 439/949, 76.2, 439/76.1, 74, 65

(56) References Cited

U.S. PATENT DOCUMENTS

| | | | | |
|---|---|---|---|---|
| 5,581,130 A | * | 12/1996 | Boucheron | 439/76.2 |
| 5,902,138 A | * | 5/1999 | Murakami | 439/76.2 |
| 6,238,221 B1 | * | 5/2001 | Ikeda et al. | 439/76.2 |
| 6,270,260 B1 | * | 8/2001 | Yanase | 439/76.2 |
| 6,402,530 B1 | * | 6/2002 | Saito et al. | 439/76.2 |
| 2001/0049211 A1 | | 12/2001 | Sumida et al. | |

* cited by examiner

Primary Examiner—Tho D. Ta
Assistant Examiner—Briggitte R. Hammond
(74) Attorney, Agent, or Firm—Oliff & Berridge, PLC

(57) ABSTRACT

An electrical junction box for a vehicle has a connector module providing connection to an electrical connector, a fuse module providing connection to a plurality of fuses, and a relay module providing connection to a plurality of relays. The connector module has a plurality of insulation substrates stacked one on another to form a layered assembly having a pair of main faces and a plurality of sides, and bus bars on the insulation substrates providing first welding tabs which are aligned with one another in at least one linear row adjacent one of the sides of the layered assembly. The fuse module has one or more insulation substrates and bus bars providing projecting second welding tabs confronting the welding tabs of the connector module. The relay module has an insulation substrate and bus bars providing third welding tabs also confronting the welding tabs of the connector module. The second and third welding tabs are welded to the first tabs to effect connection of the circuits.

9 Claims, 13 Drawing Sheets

ELECTRICAL JUNCTION BOX FOR A VEHICLE

BACKGROUND OF THE INVENTION

1. Field of Invention

The present invention relates to an electrical junction box for a vehicle, in particular a box to be connected to a wire harness for a vehicle. The invention also provides a vehicle such as an automobile having the electrical junction box mounted on it.

2. Description of Related Art

Recently, the rapid increase in the number of electric and electronic component parts that are mounted on a vehicle has led to increase in the number of circuits to be accommodated in a junction box in the vehicle. When forming branch circuits at high density, it is necessary to mount a large number of component parts on the junction box, which causes increase in the number of assembly stages.

The assignees of the present applicants proposed a junction box 1 shown in FIG. 14 in U.S. patent application Ser. No. 09/833,595. The junction box 1 of FIG. 14 is intended to be thin, capable of permitting circuit alteration and reducing time and labor when it is assembled from component parts.

In the junction box 1 of FIG. 14, a connector connection circuit (base circuit), a fuse connection circuit, and a relay connection circuit provided in the junction box 1 are formed separately as a connector module 2, a fuse module 3 and a relay module 4, respectively. The connector module 2, the fuse module 3 and the relay module 4 are incorporated in the casing composed of a lower case part 5 and an upper case part 6.

In each of the connector module 2, the fuse module 3 and the relay module 4, bus bars 2a, 3a and 4a are fixed to insulation substrates 2b, 3b and 4b, respectively, and project from the periphery of the insulation substrates where they are welded to each other.

Because the whole circuit of the junction box 1 is divided into the connector module 2, the fuse module 3 and the relay module 4, it can be avoided that tabs of the bus bars overlap on each other. Thus excessive layering of the bus bars can be prevented, and the junction box 1 can be thin. Further the circuits of the bus bars can be wired easily. Thus it is possible to reduce the area of the bus bars of each module. Consequently, even though the connector connection bus bars 2a, the fuse connection bus bars 3a and the relay connection bus bars 4a are separately formed, it is possible to reduce the total area of the bus bars and avoid increase of the area of the junction box.

Further, when the specification of any one of the connector circuit 2, the fuse circuit 3 and the relay circuit 4 is altered, it is only necessary to alter the respective module. Thus, the junction box I permits alteration of the specification easily.

However, the welding portions for connecting the modules to each other are disposed on the three sides of the connector module. Thus, it is necessary to move a welding machine or the junction box in correspondence to each welding position when carrying out welding. Therefore much time and labor are required in the welding.

SUMMARY OF THE INVENTION

It is therefore a first object of the present invention to provide an electrical junction box, suitable for use in a vehicle such as an automobile, which permits simple and efficient welding operations for connecting its modules to each other.

It is a second object of the invention to provide a method of forming bus bars for the fuse module of such an electrical junction box that is simple and minimises waste of material.

According to the invention in a first aspect there is provided an electrical junction box having a connector module that provides a connector connection circuit, which in use makes electrical connection to at least one electrical connector, a fuse module that provides a fuse connection circuit, which in use makes electrical connection to a plurality of fuses, and a relay module that provides a relay connection circuit, which in use makes electrical connection to a plurality of relays.

The connector module includes a plurality of insulation substrates stacked one on another to form a layered assembly having a pair of main faces and a plurality of sides, and bus bars fixed on the insulation substrates, the bus bars providing a plurality of projecting first welding tabs that are aligned with one another in at least one linear row adjacent one of the sides of the layered assembly.

The fuse module includes one or more insulation substrates and bus bars fixed thereon and arranged to be connected in use to the fuses and providing a plurality of projecting second welding tabs confronting the first welding tabs of the connector module.

The relay module includes one or more insulation substrates and bus bars fixed thereon and arranged to be connected in use to the relays and providing a plurality of third welding tabs also confronting the first welding tabs of the connector module.

The second and third welding tabs are welded to the first tabs to effect electrical connection of the connector connection circuit, the fuse connection circuit and the relay connection circuit.

As described above, in this junction box the welding tabs of the connector module, the welding tabs of the fuse module and the welding tabs of the relay module may be arranged linearly in one or more rows at a single side of the connector module. Thus, when welding the tabs of the connector module, the fuse module and the relay module to each other, they can be welded easily by moving a welding machine relative to the components linearly and sequentially. It is even possible to layer welding tabs of the connector module, the fuse module and the relay module respectively as a triple layer and weld them to each other in a single step. The welding tabs can be welded to each other with a small number of operations and thus the welding efficiency can be improved greatly.

Preferably the electrical junction box has a casing having upper and lower casing parts, and the connector module, fuse module and relay module are mounted in the casing with the layered assembly of the connector module lying horizontally and the insulation substrate or substrates of the fuse module extending vertically, the fuse module being adapted to receive the fuses in use in an upper row and a lower row.

In this case, the casing has a lateral opening for insertion and removal of the fuses, and the first welding tabs of the connector module are aligned in a vertically spaced pair of said linear rows. The second welding tabs of the fuse module project in a pair of aligned rows at an upper side and a lower side respectively of the insulation substrate or substrates of the fuse module and confront the first welding tabs of the pair of linear rows thereof, and the confronting first welding tabs and second welding tabs are welded to each other at the upper and lower sides of the insulation substrate or substrates of the fuse module.

This construction allows the connector module and the fuse module to be disposed in a direction in which the connector module and the fuse module intersect with each other. The welding tabs of the two modules project at upper and lower sides of the intersection region and are arranged linearly in rows. Therefore the welding tabs can be welded to each other successively along the same lines, with the confronting welding tabs layered on each other.

The relay module may be disposed above or below the connector module in such a way that the relay module is proximate to the side where the fuse module is disposed. The welding tabs of the relay module may project at positions where they confront the welding tabs of the connector module and the welding tabs of the fuse module, the welding tabs of the relay module being welded to the welding tabs of the connector module and/or the welding tabs of the fuse module.

With this construction, because the relay module and the fuse module are disposed proximately, the welding tabs of the relay module and those of the fuse module can be reduced in number and further the welding tabs can be connected to each other by layering them triply.

An electronic control unit may be disposed so that the connector module is between it and the relay module, or so that it is between the connector module and the relay module.

Welding tabs of the connector module projecting from different insulation substrates thereof layered on each other may be welded to each other to connect the different layers to each other.

In the junction box, at a connection portion where the connector module, the fuse module and the relay module are connected to external terminals (terminals of connectors, fuses or relays), a terminal of a bus bar may be connected to the connector module, the fuse module and the relay module directly or through a relay terminal. Further a fuse-mounting portion and a relay-mounting portion formed on a substrate of the fuse module and/or a substrate of the relay module may be exposed at the outer surface of the upper case, the lower case and/or the side of the casing.

The welding tabs of the connector module, the fuse module and the relay module may be welded to each other, for example, by resistance welding, ultrasonic welding or laser welding. Of these welding methods, resistance welding is most preferred.

According to the invention in a second aspect there is provided an electrical junction box having a connector module that provides a connector connection circuit, which in use makes electrical connection to at least one electrical connector, and a fuse module that provides a fuse connection circuit, which in use makes electrical connection to a plurality of fuses.

The connector module includes a plurality of insulation substrates stacked one on another to form a layered assembly having a pair of main faces and a plurality of sides, and bus bars fixed on the insulation substrates, the bus bars providing a plurality of projecting first welding tabs adjacent one of the sides of the layered assembly.

The fuse module includes one or more insulation substrates and bus bars fixed thereon and arranged to be connected in use to the fuses and providing a plurality of projecting second welding tabs.

The connector module and the fuse module are mutually disposed so that the insulation substrate or substrates of the fuse module are perpendicular to the main faces of the layered assembly of the connector module.

The fuse module has a housing having a plurality of fuse receiving locations arranged in two parallel rows extending in a longitudinal direction parallel to the main faces of the layered assembly of the connector module.

The bus bars of the fuse module having pressure connection terminals located in the fuse receiving locations to engage the fuses, wherein in the fuse module,
(i) the bus bars thereof providing the pressure connection terminals of a first one of the rows of the fuse receiving locations have welding tabs projecting from the insulation substrate or substrates thereof at a first side thereof and arranged in a linear row and welded to a first array of the first welding tabs of the bus bars of the connector module, and
(ii) the bus bars thereof providing the pressure connection terminals of the second one of the rows of the fuse receiving locations having welding tabs projecting from the insulation substrate or substrates thereof at a second side thereof opposite the first side thereof and arranged in a linear row and welded to a second array of the first welding tabs of the bus bars of the connector module.

Thus, even where a large number of fuse receiving locations are provided in the fuse module, it is possible easily to weld the welding tabs of the bus bars projected at one side of the connector module to the welding tabs of the fuse module and further very easy to perform an operation of welding a large number of the respective bus bars to each other because the welding tabs of each row are arranged linearly.

Further, because the bus bars of the fuse module can be arranged regularly, it is possible to make the fuse module compact. In particular, because one bus bar is connected to the load application side output terminal of the fuse, it is possible to allow all the bus bars to have the same configuration. Thus it is possible to enhance the yield of the material for the bus bars.

Preferably in the electrical junction box of this second aspect, the first welding tabs of the connector module are formed of projecting portions of the bus bars thereof that are bent so that the first welding tabs are arranged in two linear rows projecting in two opposite directions respectively, which two linear rows extend parallel to the longitudinal direction of the fuse module and constitute respectively the first and second arrays of the first welding tabs confronting, and welded to, the linear rows of the welding tabs of the fuse module.

Thus, the welding tabs of the bus bars of the fuse module are arranged at a position where they confront the welding tabs of the connector module that project in two different directions. By disposing the welding tabs of the connector module in this manner, they can be overlaid on the welding tabs of the fuse module. Further, because the bus bars of the connection module may be arranged regularly, it is possible to make the connector module compact.

Preferably in the electrical junction box of this second aspect, in each of the rows of the fuse receiving locations of the fuse module, a plurality of the pressure connecting terminals, which constitute power supply side input terminals for the fuses are disposed in a row at a first side of the respective row of fuse receiving locations adjacent the other of the rows of fuse receiving locations, and a plurality of the pressure connecting terminals, which constitute load application side output terminals for the fuses are disposed in a row at a second side of the respective row of fuse receiving locations distal from the other of the rows of fuse receiving locations.

The bus bars to be respectively connected to the load application side output terminals of the fuses can be formed in the same shape and configuration, as described above. On the other hand, the pressure connection terminals may be branched from one end of the bus bar to be connected to the power-supply side input terminal, whereas one welding tab is formed at the other end thereof. Therefore, the bus bars to be connected to the power-supply side input terminals may have respective different configurations.

To arrange the welding tabs of the bus bars to be connected to the output terminals respectively and the welding tabs of the bus bars to be connected to the input terminals respectively in a row, it is necessary to make the former welding tab longer than the latter tab or vice versa. Thus the bus bars to be connected to the input terminals, having a smaller number of welding tabs, are positioned at the side where the two rows of the fuse module are proximate to each other, and the length of each welding tab is increased to reduce the cost of material.

According to the invention in a third aspect, there is provided a method of forming bus bars for mounting on one or more insulation substrates of a fuse module of an electrical junction box, which fuse module is in use adapted to receive a plurality of fuses in two adjacent parallel rows, each bus bar having at one end at least one pressure connection terminal for engaging a fuse terminal in use and at a second end at least one welding tab, the method of forming the bus bars comprising the steps of (i) punching first ones of the bus bars from a first conductive metal sheet in developed form, areas of the first sheet providing the respective first bus bars being located in first and second rows in the first sheet such that when punched, the pressure connection terminals of the first bus bars of the first row are opposed to and directed towards the pressure connection terminals of the first bus bars of the second row while the welding tabs of the first bus bars of the first and second rows respectively are outwardly directed in opposite directions away from each other whereby the first bus bars as punched are mutually disposed in the same directions as in their arrangement when mounted on the insulation substrate or substrates, (ii) punching second ones of the bus bars from a second conductive metal sheet in developed form, areas of said second sheet providing the second bus bars being located in third and fourth rows in the second sheet such that when punched, the pressure connection terminals of the second bus bars of the third and fourth rows respectively are mutually outwardly directed in opposite directions away from each other while the welding tabs of said second bus bars of said third and fourth rows are interdigitally arranged alongside each other, and (iii) after punching the second bus bars from the second sheet, the second bus bars of the third and fourth rows respectively are mutually shifted to bring the pressure connection terminals thereof into position opposed to and adjacent each other, so that they are mutually disposed in the same directions as in their arrangement when mounted on the insulation substrate or substrates.

The invention further provides a method of making the fuse module, by forming bus bars as described above, and mounting them on one or more insulation substrates.

In these methods, it is preferable to take the material-consuming bus bars to be connected to the power supply side input terminals of the fuses from the same conductive metal plate by arranging their welding tabs adjacent each other. Thereby it is possible to reduce the amount of waste to a minimum.

Further the method allows the entire width of the conductive metal plate for the bus bars to be connected to the power supply side input terminals to be small. Consequently it is possible to use a metal plate for the bus bars to be connected to the power supply side input terminal, which has the same width as the conductive metal plate for the bus bars to be connected to the load application side output terminals. Thus it is possible to punch the bus bars of the first and second rows with the same compact press.

BRIEF DESCRIPTION OF THE DRAWINGS

Embodiments of the invention will now be described by way of non-limitative example, with reference to the accompanying drawings, in which.

DETAILED DESCRIPTION OF PREFERRED EMBODIMENTS

Figure 1:
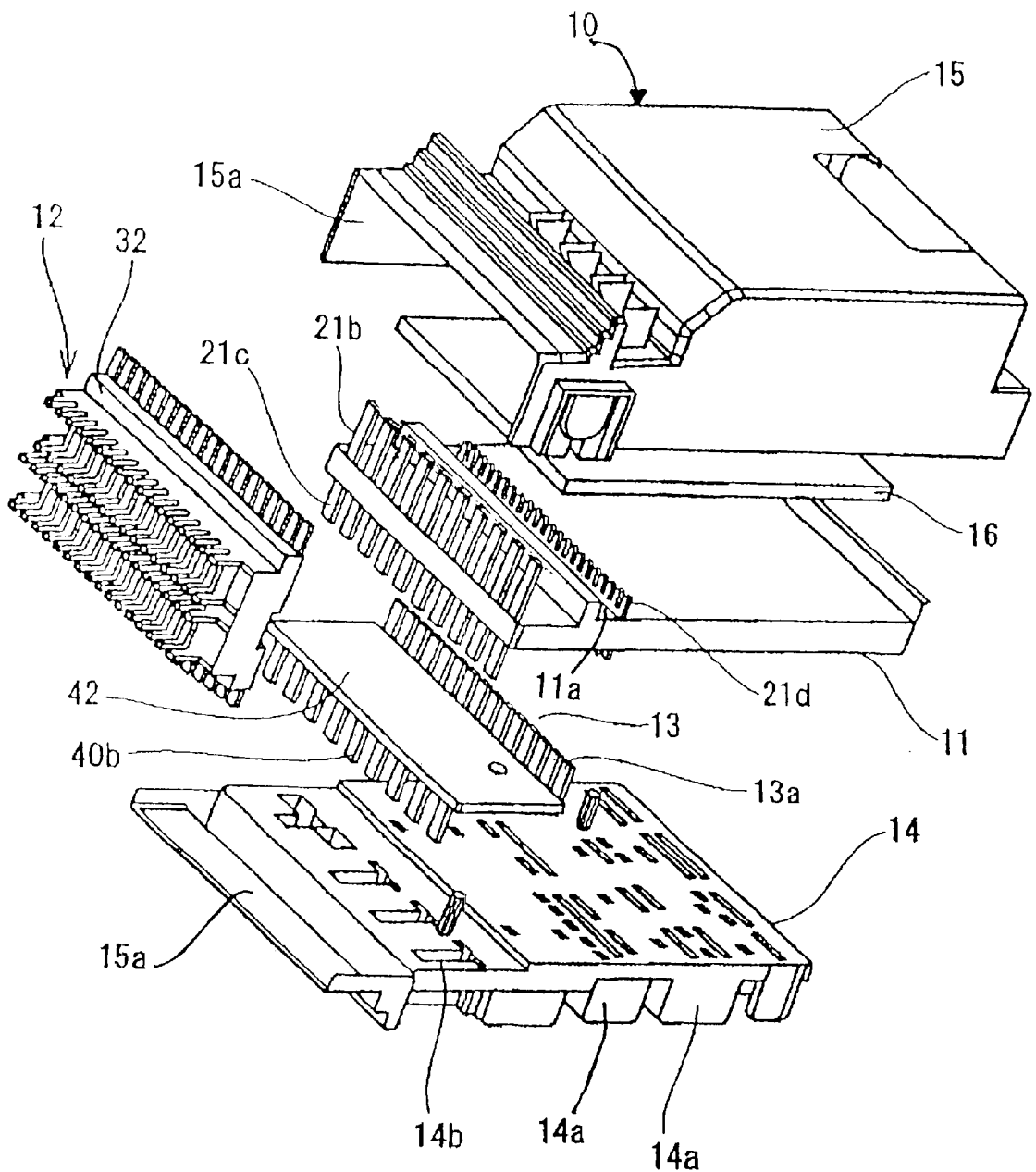
FIG. 1 is a schematic exploded perspective view showing a junction box that is a first embodiment of the present invention.
Figure 2:
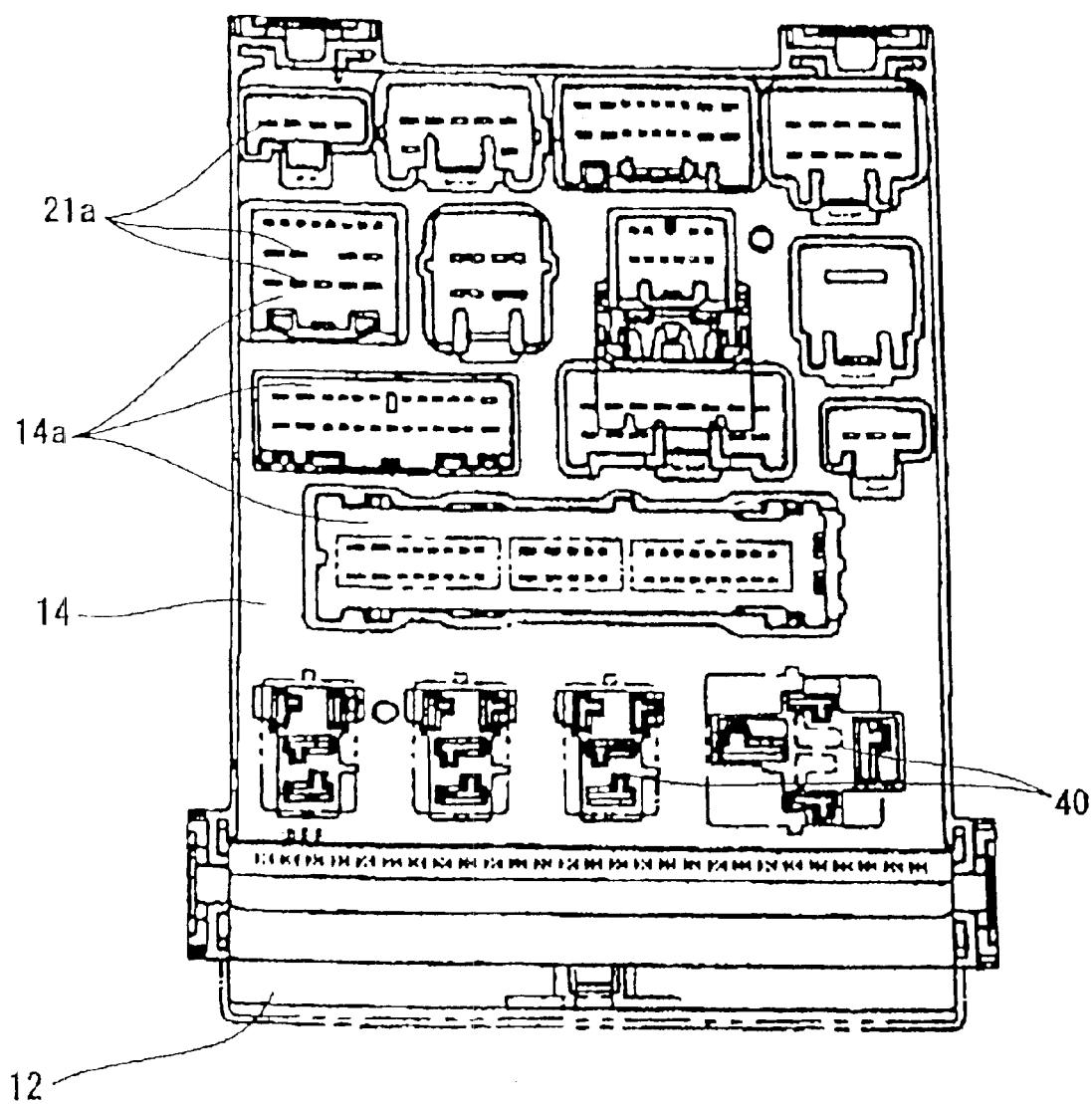
FIG. 2 is a bottom view of a lower case of the junction box of FIG. 1.
Figure 3:
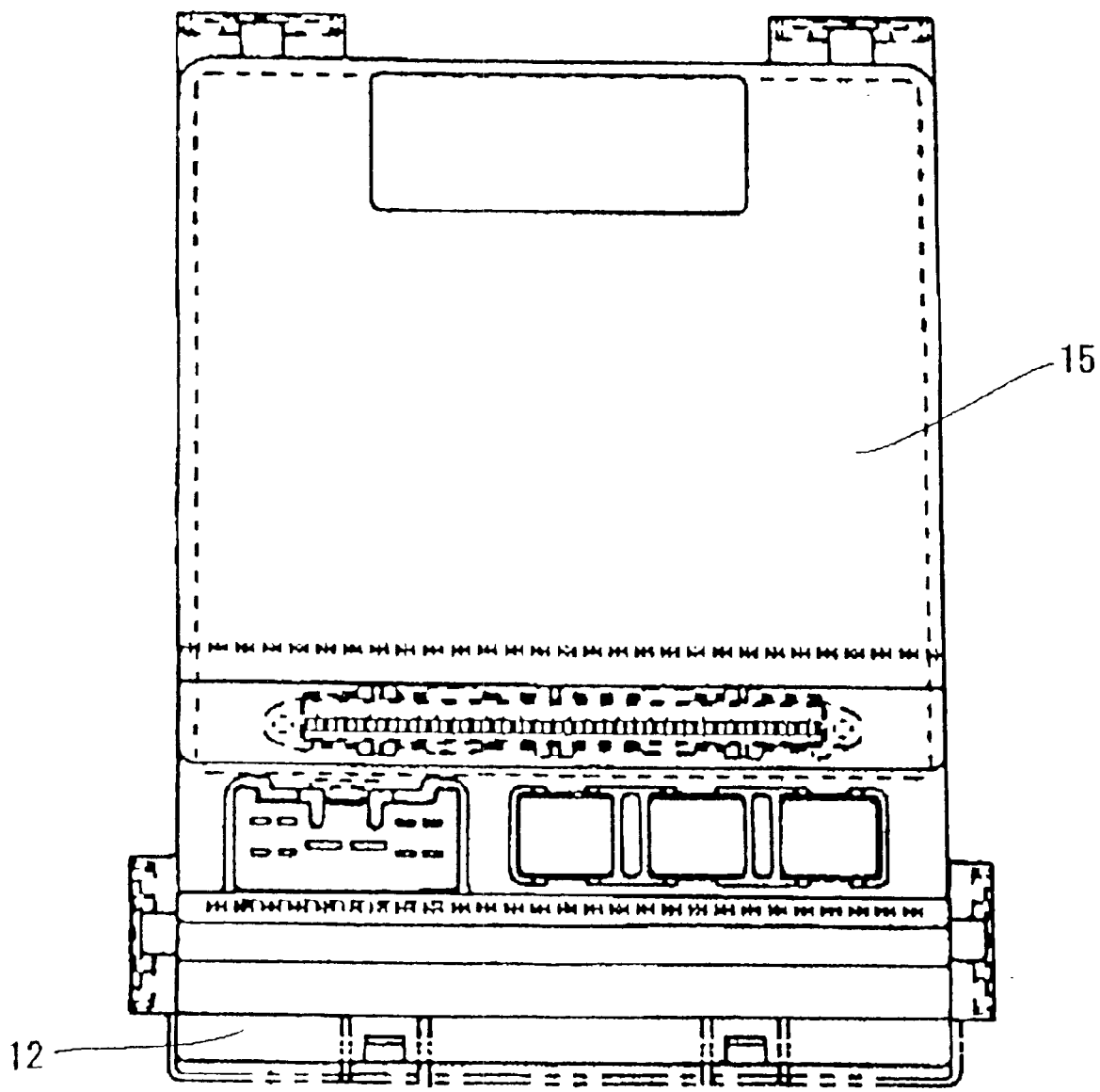
FIG. 3 is a plan view of an upper case of the junction box of FIG. 1.

FIG. 1 shows a junction box 10 adapted to be connected to at least one wire harness for a vehicle and comprising a connector module 11, a fuse module 12, a relay module 13, a lower case 14, an upper case 15 and an electronic control unit (ECU) 16. The upper and lower cases 14, 15 and the fuse module housing 32 may be of moulded plastics material.

The relay module 13, the connector module 11 and the electronic control unit 16 are sequentially stacked on the lower case 14 and shown horizontal in the drawings, though the orientation of the box in use may be different. The upper case 15 is mounted on them. A fuse module accommodation region 15a is formed at one side as an opening of the peripheral walls between the lower case 14 and the upper case 15. Fuses 30 (see FIGS. 4 and 5) are in use mounted on the fuse module 12 from one side thereof. The fuse module 12 is disposed upright in the fuse module accommodation region 15a. Relays 40 mounted in use on the lower surface of the relay module 13 are exposed to the outside through openings formed in the lower case 14. A plurality of connector accommodation portions in the form of sockets 14a, which in use receive connectors (not shown) to be connected to the connector module 11 are formed on the lower surface of the lower case 14.

Figure 4:
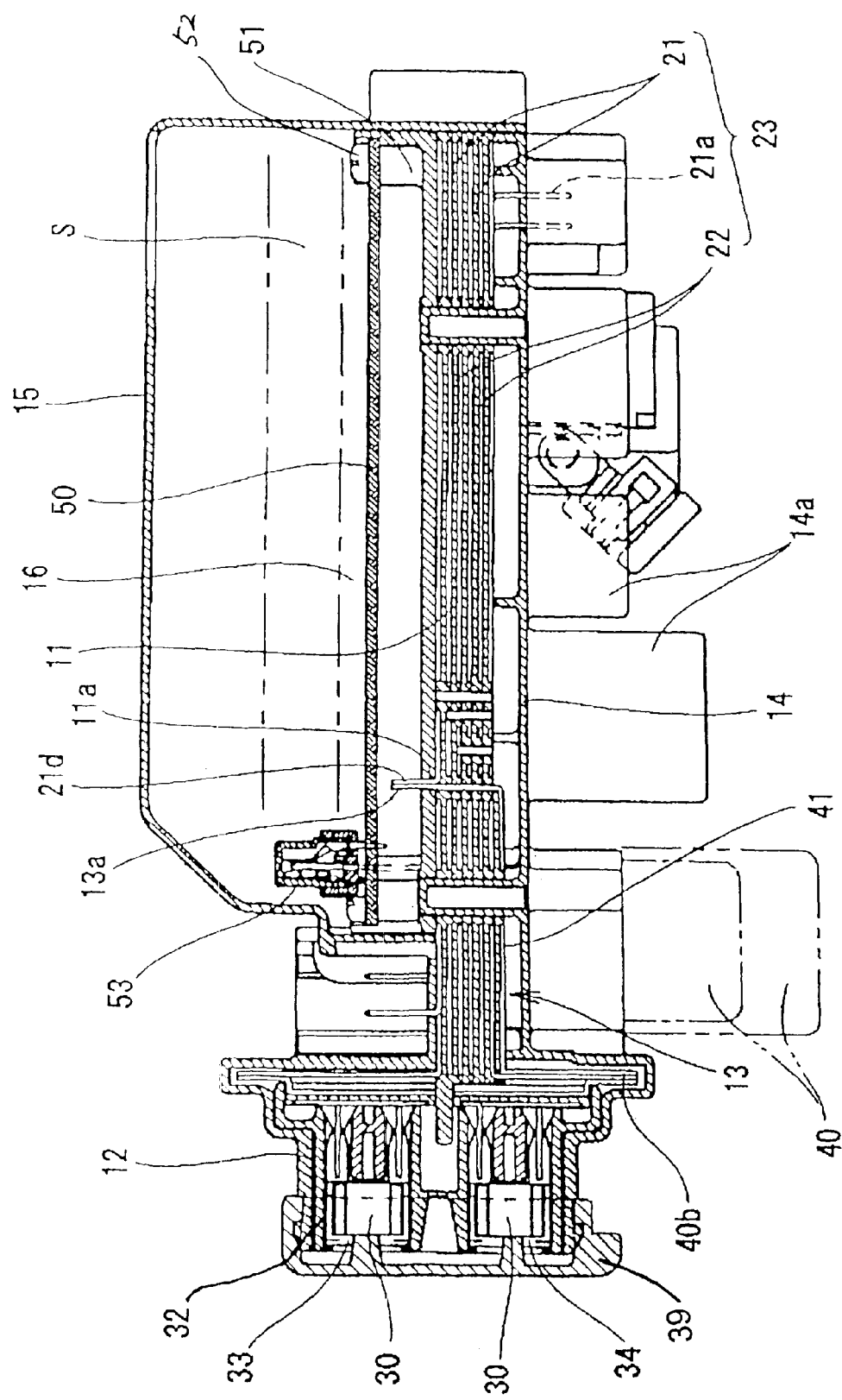
FIG. 4 is a sectional view of the junction box of FIG. 1 in its assembled state.

As shown in FIG. 4, the connector module 11 is constructed of a plurality of circuit structures 23, layered one upon another, each having an insulation plate 22 and bus bars 21 forming a circuit having a required configuration fixed to the insulation plate 22. The bus bars 21 are formed from conductive metal sheet. Tabs 21a projecting at ends of the bus bars 21 of each of the circuit structures 23 project into the connector sockets 14a of the lower case 14. The connectors (not shown) mounted on an end of a wire harness are fitted in the connector sockets 1 4a to connect their terminals to the tabs 21c (see FIG. 1) of the connector module 11.

Figure 6A:
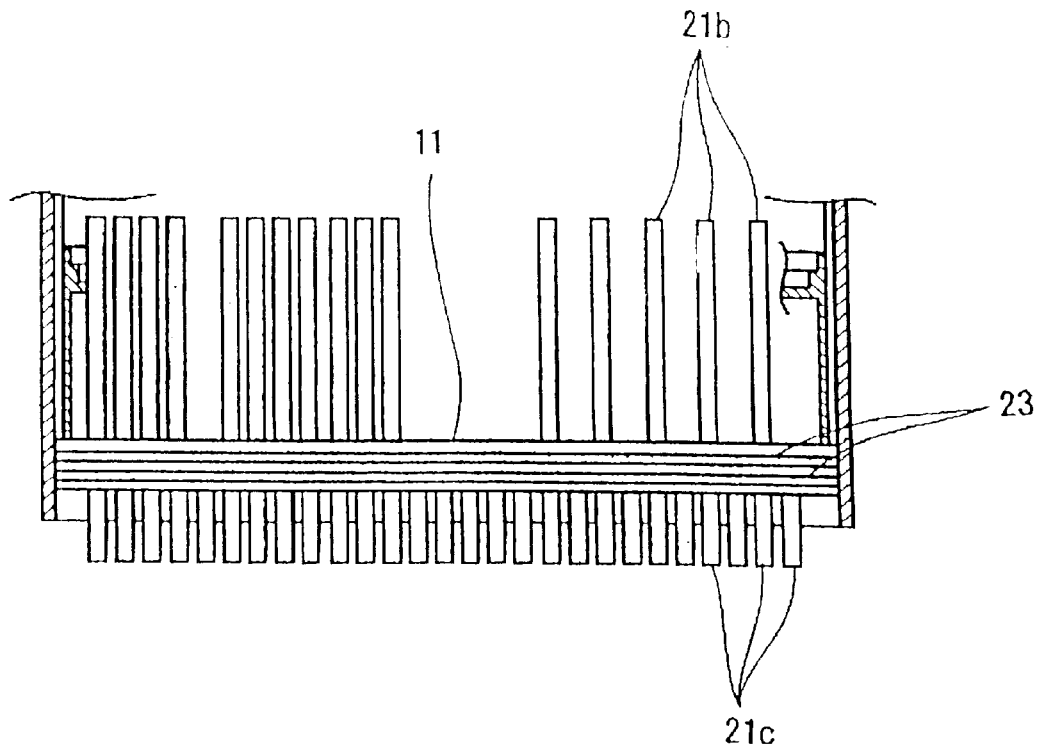
FIG. 6A is a partial side view of a connector module of the junction box of FIG. 1.
Figure 6B:
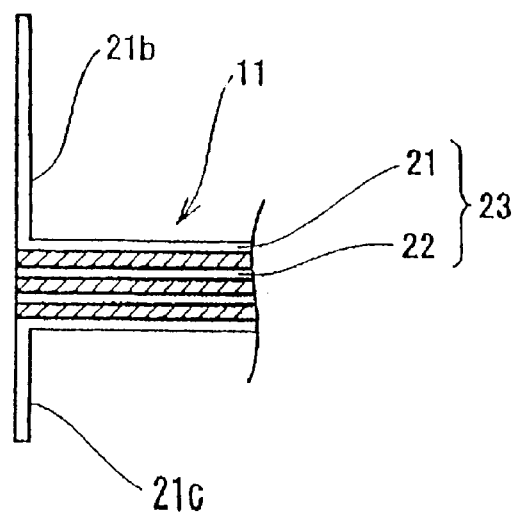
FIG. 6B is a sectional view of the connector module of FIG. 6A.

As shown in FIGS. 6A and 6B, at one side edge of the connector module 11 facing to the fuse module 12 (see FIG. 1), a plurality of welding tabs 21b, 21c formed by bending ends of selected bus bars 21 upward and downward in an L-shape are arranged collectively in respective linear rows. As shown in FIG. 4, long and narrow opening 11 a for receiving intermediate tabs 1 3a (described later) projecting from the relay module 13 is formed at a position near the centre of the connector module 11 parallel to the rows of tabs 21b, 21c. Tabs 21d to be connected to the intermediate tabs 13a of the relay module 13 are formed in a row on the connector module 11 along an edge of the opening 11a by bending up ends of selected bus bars 21.

Figure 5:
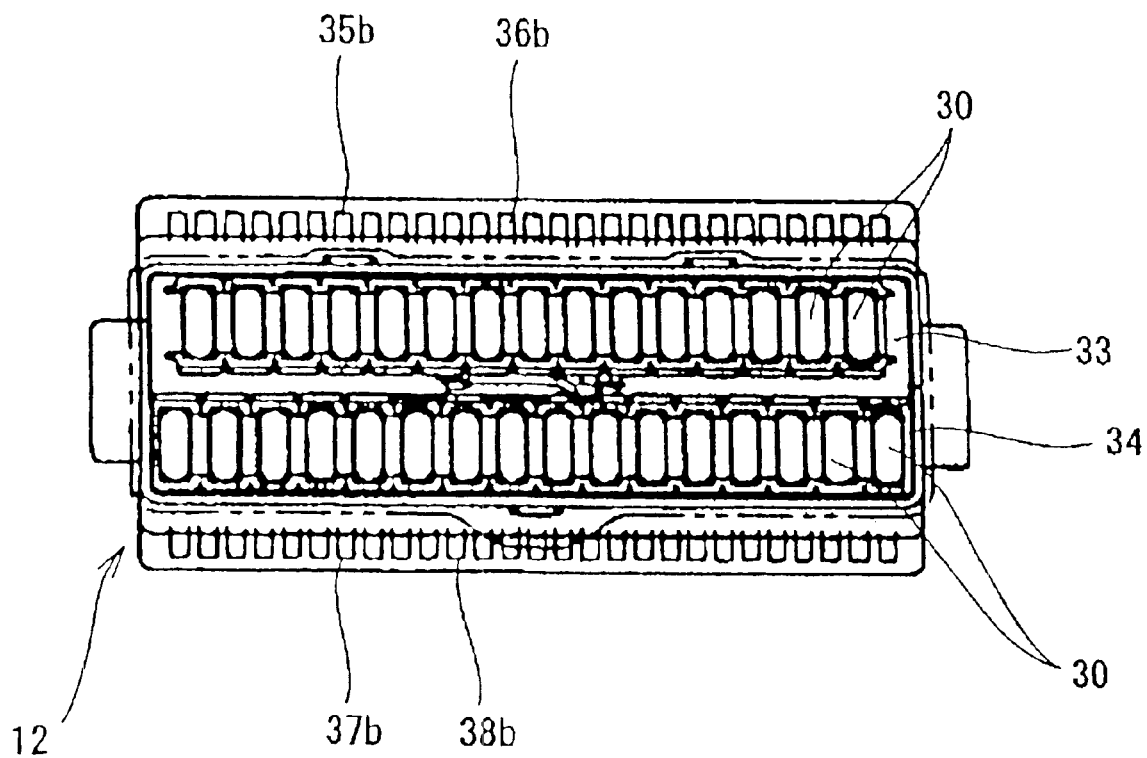
FIG. 5 is a side view of the junction box of FIG. 1 showing a fuse module.
Figure 7A:
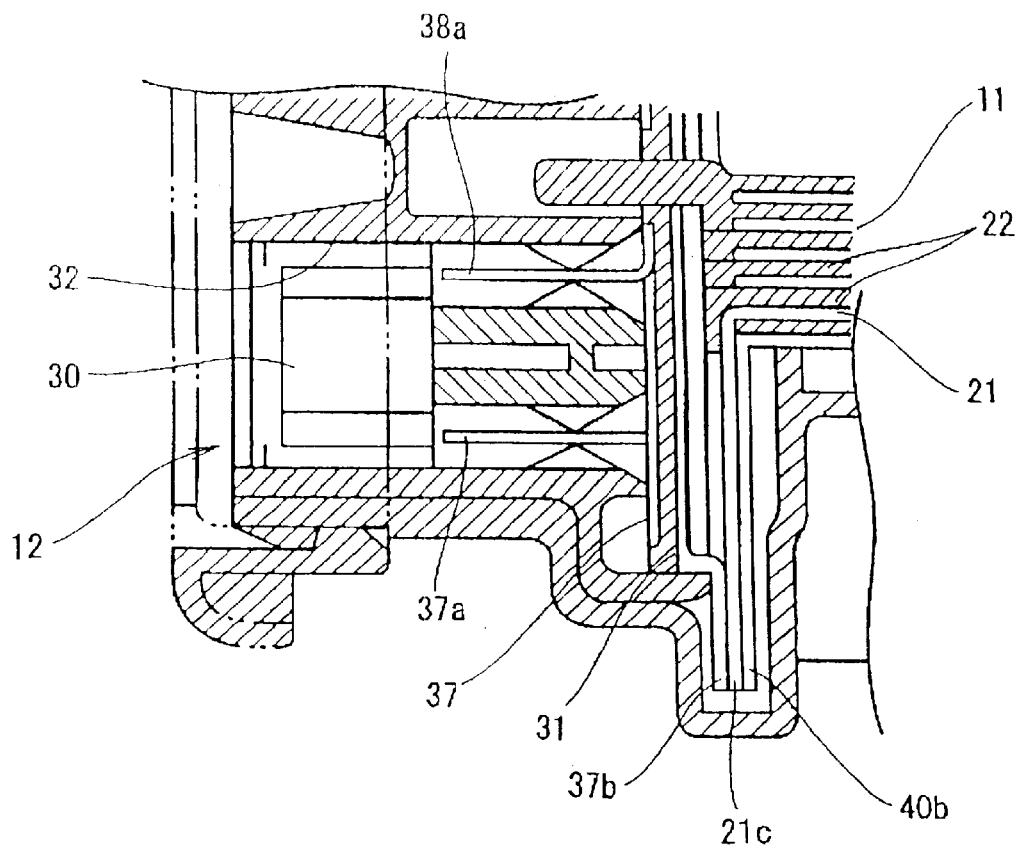
FIG. 7A is a and partial enlarged sectional view of the fuse module of FIG. 5.

As shown in FIGS. 4, 5 and 7A, the fuse module 12, which is disposed upright and adjacent one side edge of the connector module 11 has a housing 32 within the cases 14, 15 defining a plurality of fuse receiving sockets 33, 34 arranged in two rows in the longitudinal (horizontal) direction thereof. In the form of the fuse module 12 of FIG. 7A, there is a single vertical insulation substrate 31.

Figure 7B:
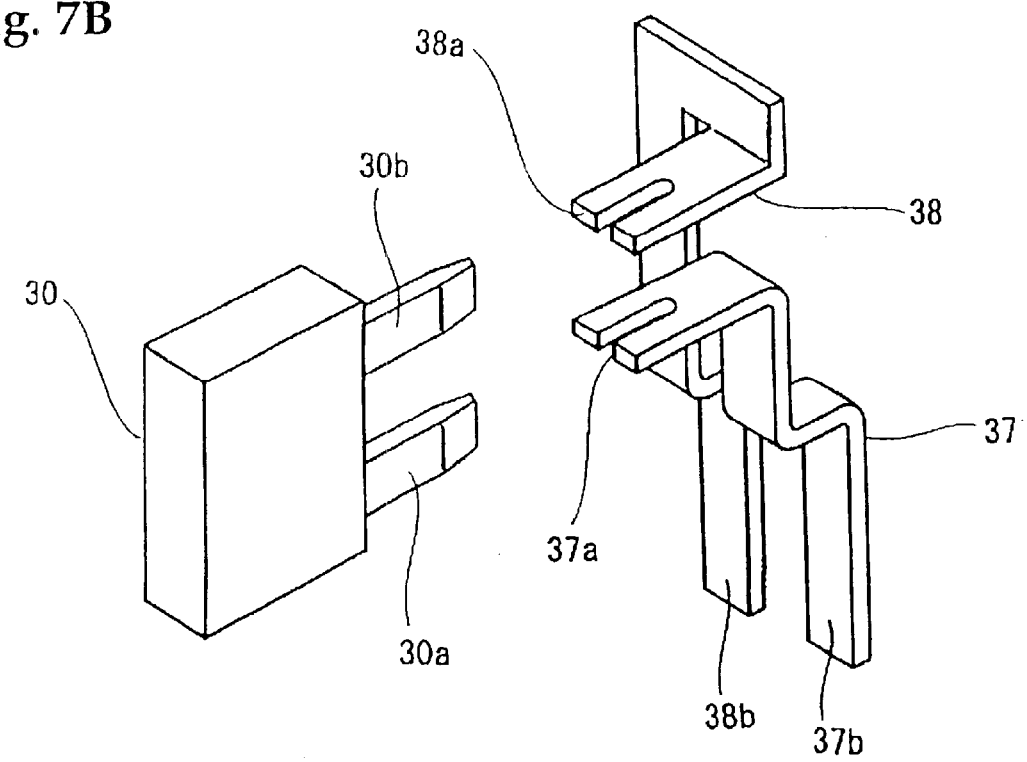
FIG. 7B is an exploded perspective view of the mount of a fuse in the fuse module of FIGS. 5 and 7A.

As shown in FIGS. 7A and 7B inside the housing 32, bus bars 37 and 38 (also 35, 36), which are bent to provide pairs of slotted pressure connection terminals 37a, 38a (35a, 36a) projecting horizontally into the fuse receiving sockets 34, (33) may be fixed on the insulation substrate 31 in two rows.

In use the pressure connection terminals 35a, 36a, 37a, 38a make detachable pressure gripping connection to the power supply side input terminal 30a and a load application side output terminal 30b of each of the fuses 30, which project into the sockets 33 of the upper row (first row) and the sockets 34 of the lower row (second row) (see FIG. 4). The fuses 30 are arranged vertically. As explained below, the upper row has the bus bars 35, 36 and the lower row has the bus bars 37, 38.

The bus bars 35, 36 of the first (upper) row may be bent upward so that welding tabs 35b, 36b of the fuse module 12 may be formed on the upper ends of the bus bars 35, 36 respectively and lie in a linear row projecting from the upper side of the housing 32 and extending in the longitudinal direction thereof.

The bus bars 37, 38 of the second (lower) row may be bent downward so that welding tabs 37a, 37b of the fuse module 12 are formed on the lower ends of the bus bars 37, 38 respectively and may be arranged in a linear row projecting from the lower side of the housing 32 and extending in the longitudinal direction thereof.

In the fuse module 12 shown in FIG. 7A, the bus bar 37 (35, 36, 38) may be on a single insulation substrate 31, so that bus bars may be shaped and bent as shown for bus bar 38 in FIG. 7B, in order that the two pressure connection terminals 37a, 37b are vertically aligned. The insulation substrate 31 may be made by moulding, with the bus bars incorporated by in situ moulding. Alternatively the bus bars may be fixed on one or both surfaces of a pre-formed substrate. In the slightly modified fuse module 12 shown in FIGS. 9 to 11 relate, there are two insulation substrates (not shown), superposed one on another, instead of the single substrate 31 of FIG. 7A. This enables the bus bars 35-38 to have a simpler shape. The bus bars 35, 37 are on one substrate and the bus bars 36, 38 are on the other substrate. The front substrate (with respect to the fuses 30) has apertures through which the pressure connection terminals project from the rear substrate.

Figure 9B:
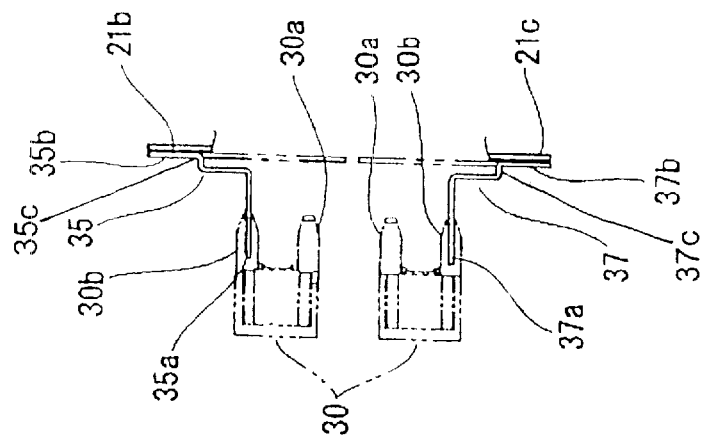
FIG. 9B shows the positions of the bus bars of FIG. 9A and the fuses and welding tabs of the connector module in the assembled state.
Figure 9A:
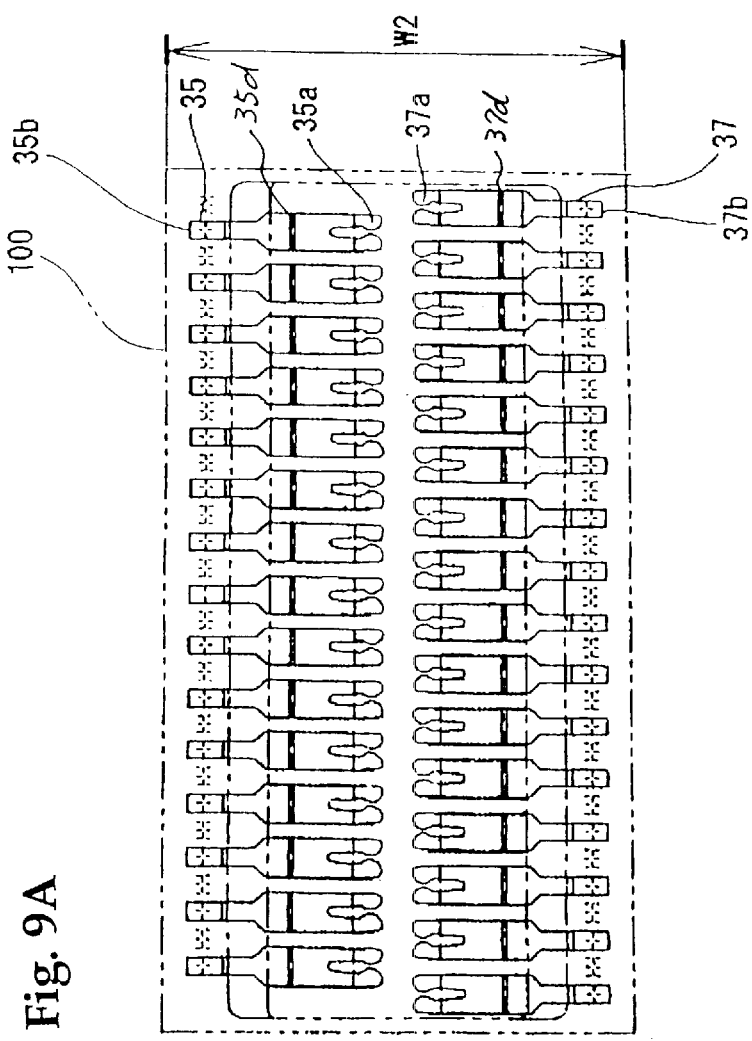
FIG. 9A shows how bus bars to be connected to the load application side output terminals of fuses of the fuse module of the junction box of FIG. 1 are formed from a conductive metal sheet.
Figure 10A:
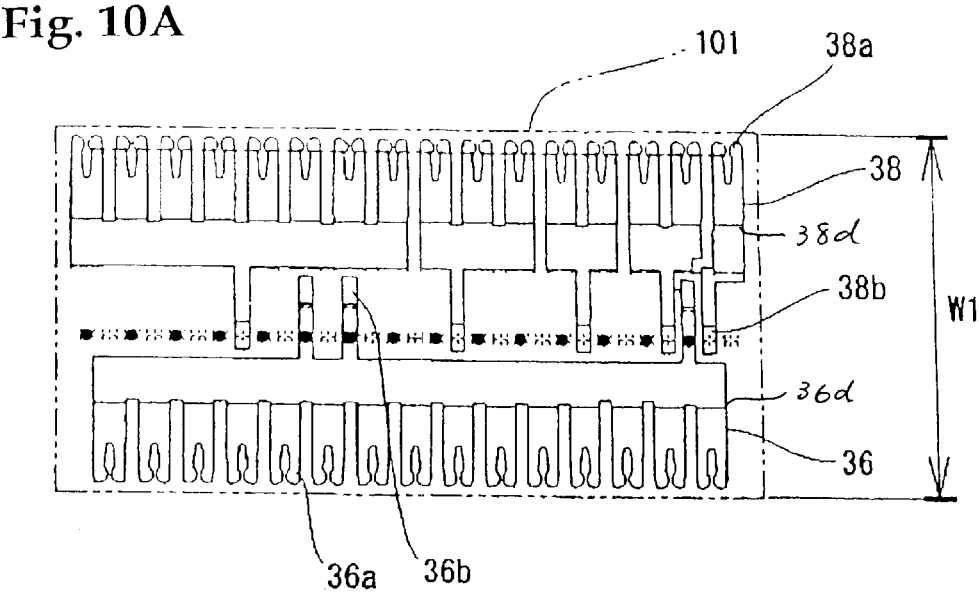
FIG. 10A shows how bus bars to be connected to the power supply side input terminals of the fuses of the fuse module of the box of FIG. 1 are formed from a conductive metal sheet.

As shown in FIGS. 9A and 10A, the bus bars 35-38 of the fuse module 12 are formed by punching conductive metal sheets 100 and 101. FIG. 9A shows how the bus bars 35 to be connected to the first row of the load application side output terminals of the fuses and the bus bars 37 to be connected to the second row of the load application side output terminals of the fuses are punched from the first conductive metal sheet 100. The bus bars 35, 37 as punched from the sheet 100 may be arranged such that the terminals 35a, 37a confront each other and the welding tabs 35b, 37b of the fuse module 12 face outwardly in opposite directions. The bus bars 35, 37 may be spaced in the sheet 100 at regular intervals. After being punched, each of the bus bars 35, 37 is bent at the positions 35d and 37d, respectively.

FIG. 9B shows how the load application side output terminals 30b of the fuses 30 and the bus bars 35, 37 are connected to each other by pressure connection when the bus bars 35, 37 are mounted in the fuse module 12 and also shows the positions where the tabs 37a, 37b of the bus bars 35, 37 are welded to the welding tabs 21b, 21c of the connector module 11 respectively.

FIG. 10A shows how the bus bars 36 to be connected to the first row of the power source side input terminals of the fuses and the bus bars 38 to be connected to the second row of the power source side input terminals of the fuses are punched from the conductive metal sheet 100. As punched from the sheet 101 the pressure connection terminals 36a, 38a may be in respective rows having the same configuration. However because the terminals 36a, 38a are branched in groups from the welding tabs 36b, 38b, the configuration of the welding tabs 36b and that of the welding tabs 38b may be different, and the welding tabs 36b, 38b may be staggered from each other in the longitudinal direction of the rows.

Therefore, in forming the bus bars 36, 38 from the conductive metal sheet 101, the terminals 36a, 38a are disposed in reverse directions, extending outwardly. On the other hand, the welding tabs 36b, 38b are disposed alongside each other interdigitally in the same region of the sheet 101.

Figure 10B:
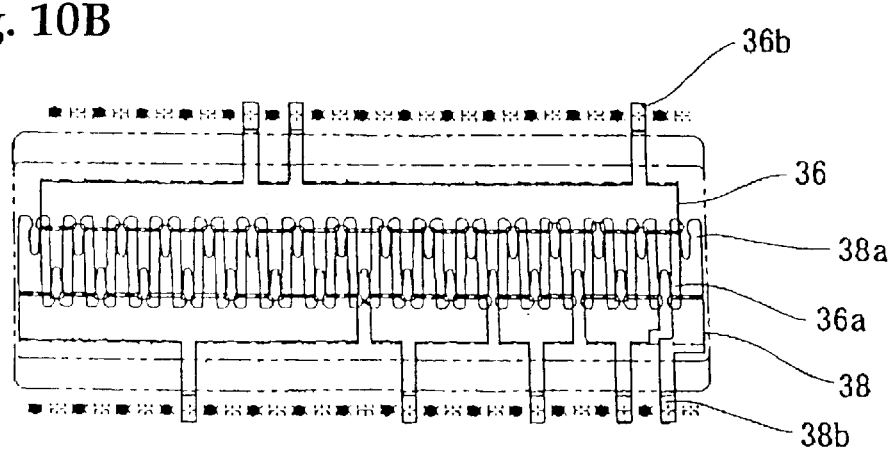
FIG. 10B shows the positions of the bus bars of FIG. 10A moved after the conductive metal sheet is punched.

After punching, the bus bars 36, 38 may be bent at the positions 36d and 38d, respectively, in FIG. 10A, and then the positions of the bus bars 36, 38 are changed as shown in FIG. 10B (as if the bus bars 36, 38 were flat) so that the pressure welding terminals 36a, 38a are disposed face to face.

FIGS. 7A and 7B show an example of bending the bus bars 37, 38.

FIG. 1C shows how the power supply side input terminals 30a of the fuses 30 and the bus bars 36, 38 are connected to each other by pressure connection after the bus bars 36, 38 are mounted in the fuse module 12 and also shows the positions where tabs 36b, 38b of the bus bars 36, 38 may be welded to the welding tabs 21b, 21c of the connector module 11 respectively.

The positions of the welding tabs 36b of the bus bars 36 and those of the welding tabs 38b of the bus bars 38 are respectively such that the welding tabs 36b are interposed among the welding tabs 35b in their linear row and likewise the welding tabs 38b are interposed among the welding tabs 37b in their linear row, as shown in FIG. 5. Thus, the length of bent portions 36c of the bus bars 36 and the length of bent portions 38c of the bus bars 38 are greater than the length of bent portions 35c of the bus bars 35 and bent portions 37c of the bus bars 37 respectively.

Figure 11:
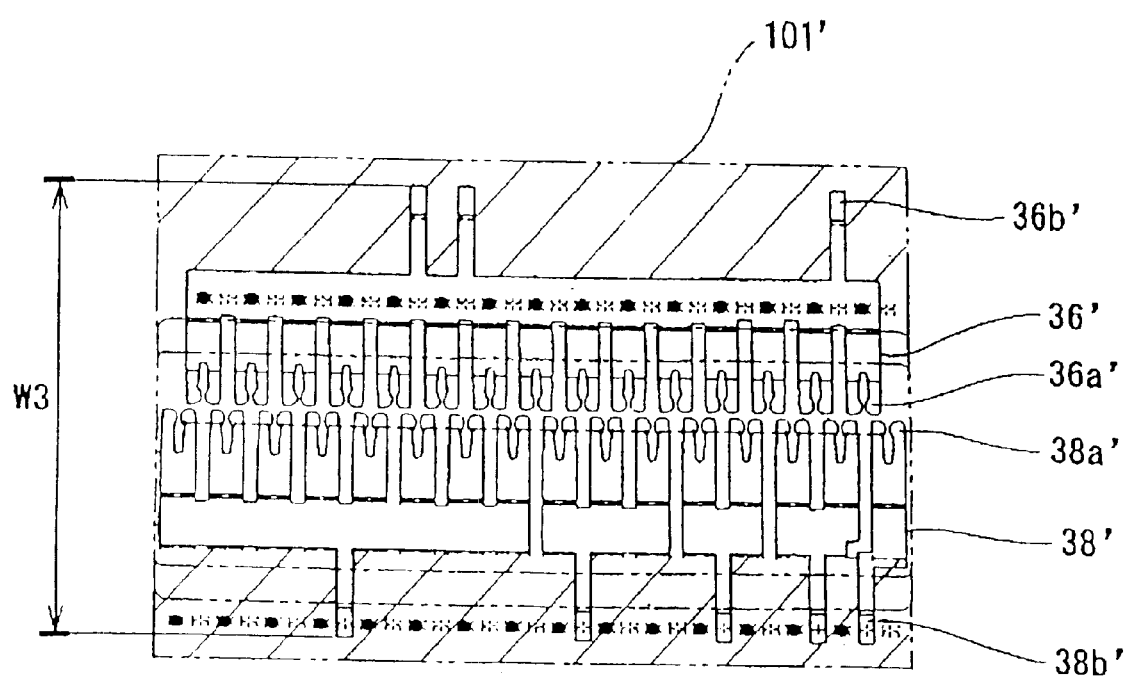
FIG. 11 shows another method by which the bus bars of FIG. 10A are taken out of a conductive metal sheet.

As shown in FIG. 9A, when the bus bars 36, 38 are formed from the conductive metal sheet 100, the material of the sheet can be used with minimal waste. This will be illustrated by reference to FIG. 11. Let it be supposed that as shown in FIG. 11, bus bars 36' arranged in a row and bus bars 38' arranged in another row are taken from a conductive metal sheet 101', with the pressure welding terminals 36a' of the bus bars 36' and e pressure welding terminals 38a' of the bus bars 38' confronting each other and with welding tabs 36b' and 38b' facing outwardly in opposite directions in a developed configuration. In this case, portions of large area of the conductive metal sheet 101' covered with oblique lines in FIG. 11 are wasted. It may be necessary to make the welding tabs 36b', 38b' of the bus bars 36', 38' to be connected to the power supply side input terminals longer than the bus bars 35, 37 to be connected to the load application side output terminals. Thus, a large area of the material may be wasted and farther the width W3 of the conductive metal plate 101' may be required to be large.

Figure 10C:
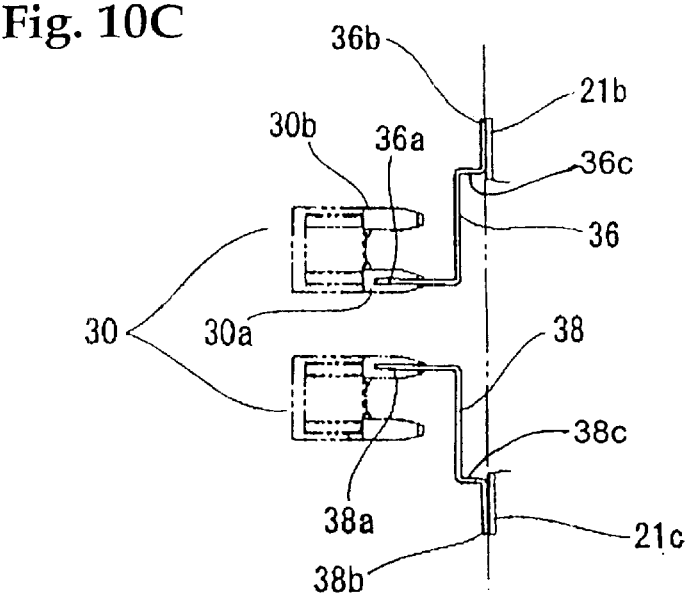
FIG. 10C shows the positions of the bus bars of FIG. 10A and the fuses and welding tabs of the connector module in the assembled state.

On the other hand, in the case where the welding tabs 36b, 38b are taken from the same region of the conductive metal sheet 101, as shown in FIG. 10, a small portion thereof is wasted. More specifically, it is possible to make the width W1 of the conductive metal plate 101 less than the width W3 of the conductive metal plate 101 ' by the length of the welding tab 36b' (38b'). Thus, it is possible to make the width W1 of the conductive metal sheet 101 for the bus bars to be connected to the power supply side input terminals almost equal to the width W2 of the conductive metal sheet 100 for the bus bars to be connected to the load application side output terminals. Therefore, the bus bars can be easily produced at low cost.

FIG. 4 shows a cover 39 for the fuses 30, fitting on the cases 14, 15.

Figure 8:
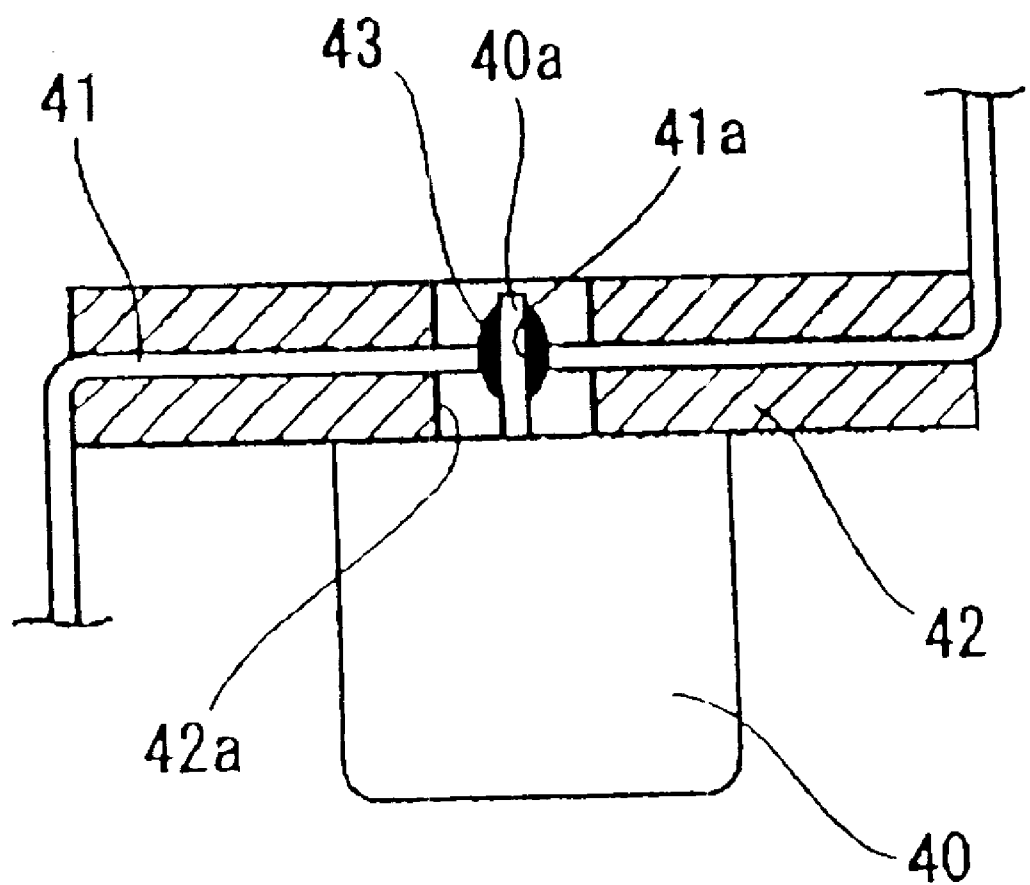
FIG. 8 is a partial sectional view of the connection of a relay and a bus bar of the relay module of the junction box of FIG. 1 connected to each other.

As shown in FIGS. 1 and 4, the relay module 13 is disposed below the connector module 11 and at a position proximate to the side where the fuse module 12 is arranged. Bus bars 41 are mounted on a substrate 42 of the relay module 13. As shown in FIG. 8, the body of the relay 40 engages the lower surface of the substrate 42. A terminal 40a of the relay 40 is inserted into openings 41a and 42a formed on the bus bar 41 and the substrate 42 respectively and welded to the bus bar 41 with solder 43. Thus, the terminal 40a of the relay 40 is joined with the relay module directly and permanently. Alternatively, detachable pressure connection terminals may be provided on the relays and the bus bars 41.

One end of the bus bar 41 welded to the terminal 40a of the relay 40 is bent to project upward at the right end of the substrate 42 as seen in FIG. 4 to form the intermediate tab 13a of the relay module 13 confronting the intermediate tab 21d of the connector module 11. Other bus bars of the relay module 13 are bent up in the same way. The other ends of respective bus bars 41 are bent down and aligned in confrontation with the welding tabs 21c of the connector module 11 at the left end of the substrate 42 to form welding tabs 40b of the relay module 13.

As shown in FIG. 4, the electronic control unit 16 has electronic parts (not shown) mounted on the upper surface of a substrate 50. The electronic control unit 16 is placed on a support 51 projecting from the upper surface of the connector module 11 and fixed to an upper portion of the connector module 11 with a screw 52. In this state, the electronic parts are disposed in a space S disposed between the substrate 50 and the upper case 15.

Printed electrical conductors are arranged at one edge of the substrate 50. The vertically extending bus bar-shaped relaying terminals 53 and the electrical conductors are connected to each other via an ECU (electronic control unit) connector or directly. The lower end of the relay terminals 53 are connected to bus bars 21 of the connector module 11.

To assemble the junction box 10 composed of the above-described component parts, the relay module 13, the connector module 11 and the electronic control unit 16 can be mounted one upon another sequentially. Then the electrical conductors of the electronic control unit 16 are connected to the bus bars 21 of the connector module 11 through the relay terminals 53. Thereafter, with the connector module 11 and the relay module 13 layered on each other, the intermediate tabs 13a of the relay module 13 projected through the opening 11a of the connector module 11 and the confronting intermediate tabs 21d of the connector module 11 are joined with each other by a suitable welding technique.

The fuse module 12 may be placed at a predetermined position, with the welding tabs 35b, 36b, 37b, 38b of the fuse module 12 confronting the welding tabs 21b, 21c 21b of the connector module 11. The welding tabs 21b, 21c of the connector module 11 and the welding tabs 35b, 36b, 37b, 38b of the fuse module 12 arranged in rows are sequentially welded to each other. At the lower side, in this welding, the welding tabs 21c of the connector module 11 and the welding tabs 37b, 38b of the fuse module 12 are also layered on the pressure welding tabs 40b of the relay module 13. More specifically, with the welding tab 21c of the connector module 11 sandwiched between the pressure welding tab 40b of the relay module 13 and the welding tab 37b or 38b of the fuse module 12, these three tabs may be welded to each other. As desired, pressure welding tab 40b of the relay module 13 and a welding tab 37b or 38b of the fuse module 12 may be welded to each other directly.

In connecting the connector module 11, the fuse module 12 and the relay module 13 to one another, the welding tabs of the connector module 11, the welding tabs of the fuse module 12 and the welding tabs of the relay module 13 may be arranged linearly along one side of the fuse module 12. Thus the welding operation can be accomplished efficiently. Resistance welding of these tabs is preferred but any suitable welding method may be employed.

After completion of this welding operation, the connector module 11, the fuse module 12, the relay module 13 and the electronic control unit 16 joined with each other may be fixedly disposed between the lower case 14 and the upper case 15.

Figure 12:
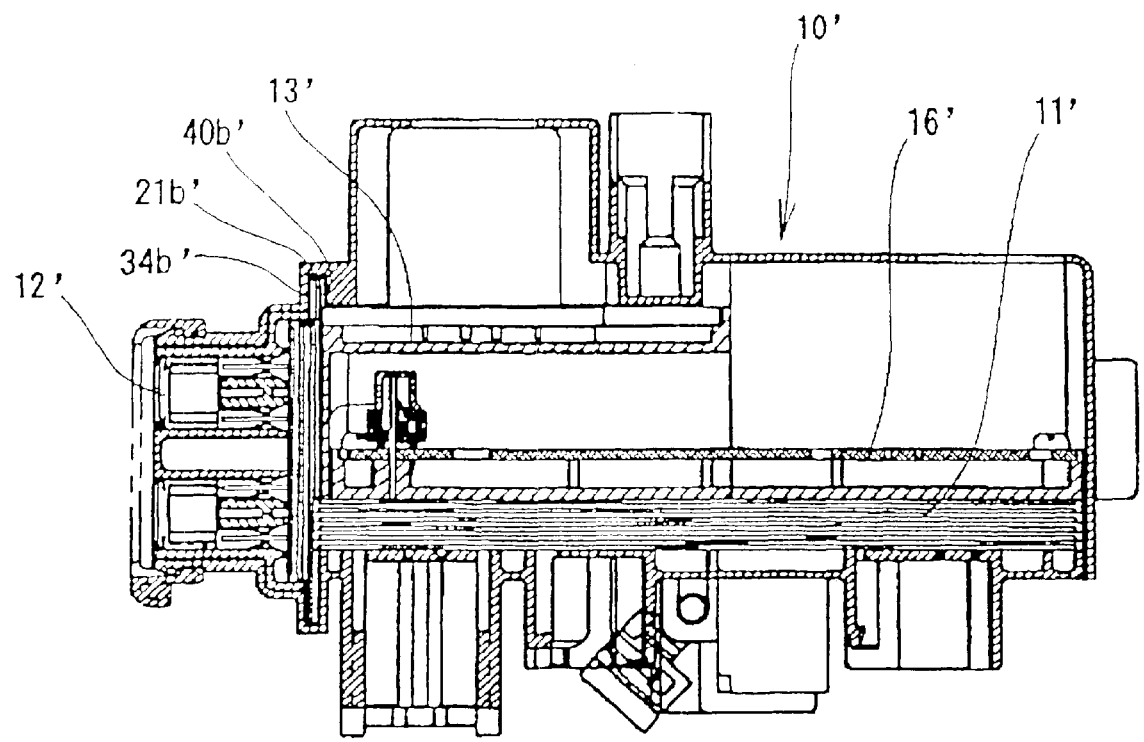
FIG. 12 is a sectional view of a junction box that is a second embodiment of the present invention.

FIG. 12 shows a junction box 10' of a second embodiment in which a relay module 13' is disposed above a connector module 11', and an electronic control unit 16' is disposed between the connector module 11' and the relay module 13'. In this case, welding tabs 40b' of the relay module 13', upper welding tabs 34b' of the fuse module 12', and welding tabs 21b' of the connector module 11' are welded to each other. The other features of the construction of the second embodiment correspond to those of the first embodiment, and need not be described again.

Figure 13:
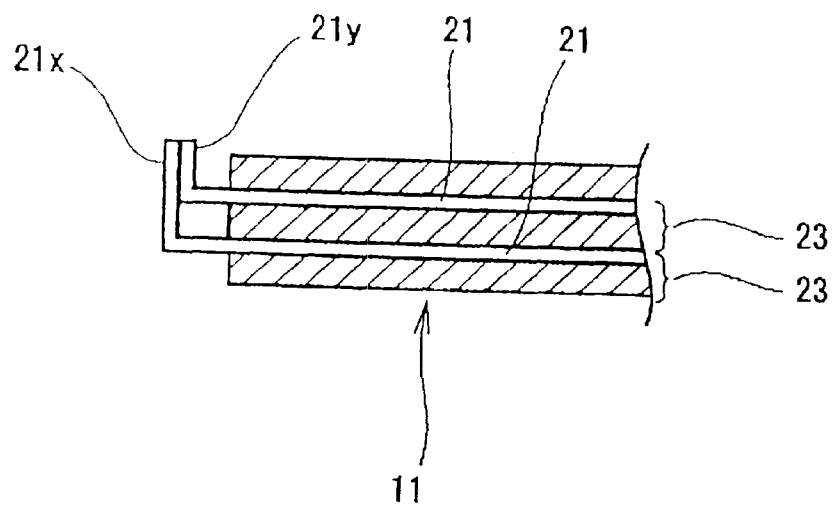
FIG. 13 is a schematic view showing bus bar connections in another embodiment of the invention.
Figure 14:
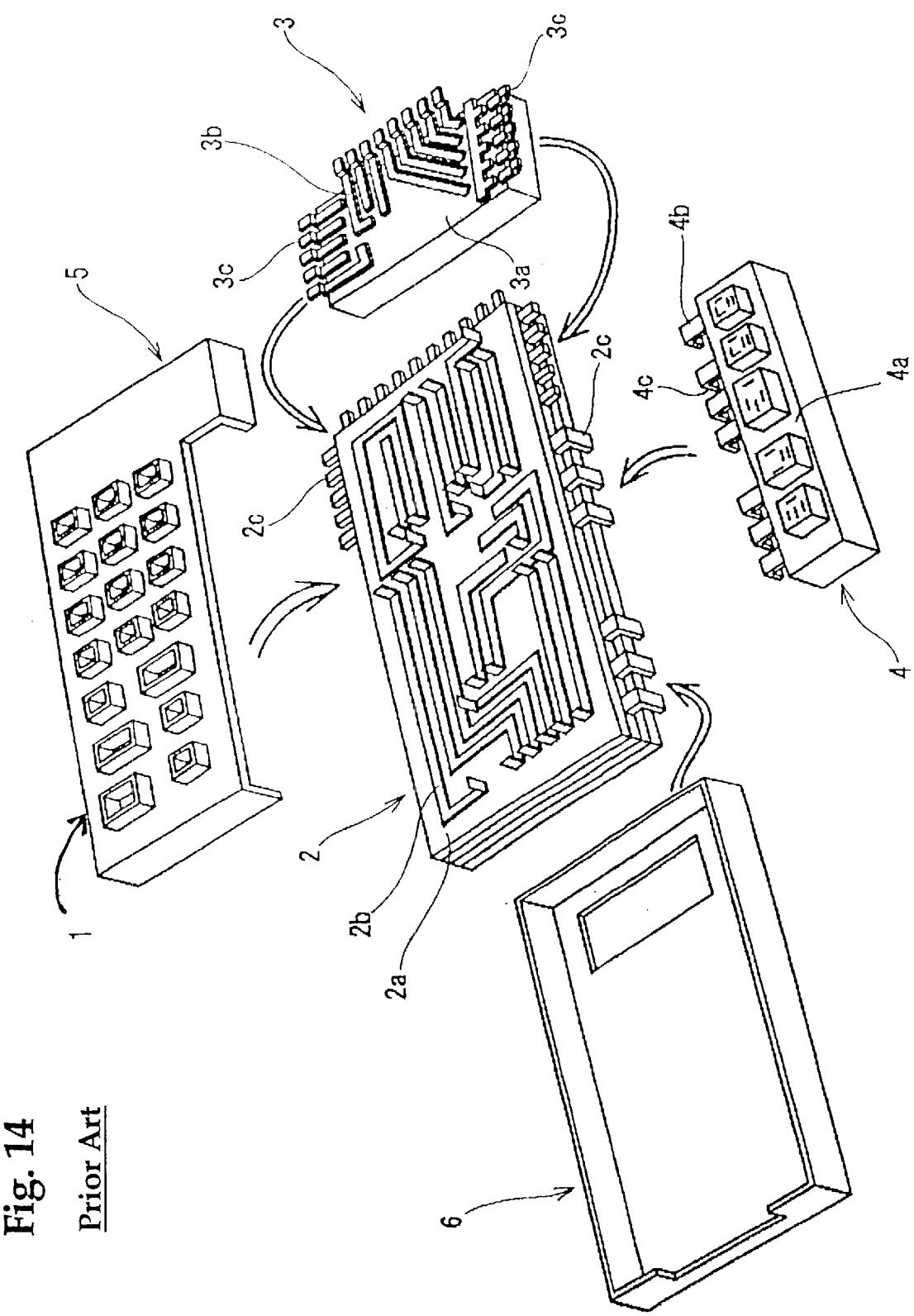
FIG. 14 is an exploded perspective view showing a known junction box.

FIG. 13 shows a feature of a modified embodiment, in which a tab 21x, which is a part of the welding tab of the connector module 11 projecting from one circuit structure 23 of the connector module 11, may be welded to a welding tab 21y projecting from another circuit structure 23, with the welding tabs 21x and 21y layered on each other. More specifically, the welding tabs 21x and 21y bent up to an L-shape are laid on each other and welded together. The position where such welding tabs 21x and 21y projecting from different layers are welded to each other is preferably located at an intermediate position or an outer end of one of the linear locations where the tabs of the fuse module and the relay module are welded to each other and to the connector module tabs, so that the welding tabs 21x and 21y may be welded to each other simultaneously with the welding of the tabs of the fuse module and the relay module.

As apparent from the foregoing description, in the junction box of the present invention, the welding tabs of the connector module, those of the fuse module or/and those of the relay module are arranged collectively in one or more linear rows at one side of the connector module or intermediately. Thus, the welding work for connecting these modules to each other can be performed efficiently. Accordingly, it is possible to reduce the number of steps in assembling the junction box and thus reduce the manufacturing cost. Further, because the welding portions can be collectively disposed, it is possible to make the junction box compact. Furthermore, in the case where the welding tabs of the connector module, the fuse module and the relay module are layered triply on each other, it is possible to make the number of welding operations much fewer than the case in which the welding portions are separately disposed. Thus, it is possible to enhance the efficiency.

Because the connector connection bus bars, the fuse connection bus bars, and the relay connector connection bus bars are separately provided on the respective modules, tabs to be connected to connectors, fuses and relays are disposed in different positions and do not overlap each other. Consequently it is unnecessary to increase the number of layers of bus bars to form tabs. This makes it possible for the junction box to be compact.

Further, when the specification of any one the connector module, the fuse module and the relay module is altered, it is necessary to alter only one of them. That is, it is unnecessary to alter the entire construction of the junction box. Therefore, it is possible to cope with the alteration of the specification in a short time and at a low cost.

While the invention has been described in conjunction with the exemplary embodiments described above,.many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An electrical junction box, comprising:
   a connector module that provides a connector connection circuit which in use makes electrical connection to at least one electrical connector;
   a fuse module that provides a fuse connection circuit which in use makes electrical connection to a plurality of fuses; and
   a relay module that provides a relay connection circuit which in use makes electrical connection to a plurality of relays, wherein
      said connector module comprises a plurality of insulation substrates stacked one on another to form a layered assembly having a pair of main faces and a plurality of sides, and bus bars fixed on said insulation substrates, said bus bars providing a plurality of projecting first welding tabs which are aligned with one another in at least one linear row adjacent one of said sides of said layered assembly,
      said fuse module comprises at least one insulation substrate and bus bars fixed thereon and arranged to be connected in use to said fuses and providing a plurality of projecting second welding tabs confronting said first welding tabs of said connector module,
      said relay module comprises at least one insulation substrate and bus bars fixed thereon and arranged to be connected in use to said relays and providing a plurality of third Welding tabs also confronting said first welding tabs of said connector module, and
      said second and third.welding tabs are welded to said first welding tabs to effect electrical connection of said connector connection circuit, said fuse connection circuit and said relay connection circuit.

2. An electrical connection box according to claim 1, further comprising a casing having upper and lower casing parts, wherein said connector module, said fuse module and said relay module are mounted in said casing with said layered assembly of said connector module lying horizontally and said at least one insulation substrate of said fuse module extending vertically, said fuse module being adapted to receive said fuses in use in an upper row and a lower row, said casing has a lateral opening for insertion and removal of said fuses,
   said first welding tabs of said connector module are arranged in a vertically spaced pair of said linear rows,
   said second welding tabs of said fuse module project in a pair of linear rows at an upper side and a lower side respectively of said at least one insulation substrate of said fuse module and confronting said first welding tabs of said pair of linear rows thereof, and
   said confronting first welding tabs and second welding tabs are welded to each other at said upper and lower sides of said at least one insulation substrate of said fuse module.

3. An electrical junction box according to claim 1, wherein said relay module is mounted adjacent one of said main faces of said layered assembly of said connector module and adjacent said fuse module, and said third welding tabs of said relay assembly confront and are welded to both said first welding tabs and said second welding tabs.

4. An electrical junction box according to claim 1, having an electronic control unit disposed between said connector module and said relay module.

5. An electrical junction box according to claim 1, wherein said bus bars of said connector module provide a plurality of fourth welding tabs which project from said insulation substrates of said connector module and are welded to each other to effect electrical connections within said connector module.

6. An electrical junction box, comprising:
   a connector module that provides a connector connection circuit which in use makes electrical connection to at least one electrical connector; and,
   a fuse module that provides a fuse connection circuit which in use makes electrical connection to a plurality of fuses, wherein
      said connector module comprises a plurality of insulation substrates stacked one on another to form a layered assembly having a pair of main faces and a plurality of sides, and bus bars fixed on said insulation substrates, said bus bars providing a plurality of projecting first welding tabs adjacent one of said sides of said layered assembly,
      said fuse module comprise at least one insulation substrate and bus bars fixed thereon and arranged to be connected in use to said fuses and providing a plurality of projecting second welding tabs,
      said connector module and said fuse module are mutually disposed so that said at least one insulation substrate of said fuse module is perpendicular to said main faces of said layered assembly of said connector module,
      said fuse module has a housing having a plurality of fuse receiving locations arranged in two parallel rows extending in a longitudinal direction parallel to said main faces of said layered assembly of said connector module, and
      said bus bars of said fuse module have pressure connection terminals located in said fuse receiving locations to engage said fuses,
   wherein in said fuse module
      (i) said bus bars of said fuse module providing said pressure connection terminals of a first one of said rows of said fuse receiving locations have welding tabs projecting from said at least one insulation substrate thereof at a first side thereof and arranged in a linear row and welded to a first array of said first welding tabs of said bus bars of said connector module, and
      (ii) said bus bars of said fuse module providing said pressure connection terminals of the second one of said rows of said fuse receiving locations having welding tabs projecting from said at least one insulation substrate thereof at a second side thereof opposite said first side thereof and arranged in a linear row and welded to a second array of said first welding tabs of said bus bars of said connector module.

7. An electrical junction box according to claim 6, wherein said first welding tabs of said connector module are formed of projecting portions of said bus bars of said connection module which are bent so that said first welding tabs are arranged in two linear rows projecting in two opposite directions respectively, which two linear rows extend parallel to said longitudinal direction of said fuse module and constitute respectively said first and second arrays of said first welding tabs confronting, and welded to, said linear rows of said welding tabs of said fuse module.

8. An electrical junction box according to claim 7, wherein in each of said rows of said fuse receiving locations of said fuse module, a plurality of said pressure connection terminals, which constitute power supply side input terminals for said fuses, are disposed in a row at a first side of the respective row of fuse receiving locations adjacent to the other of said rows of fuse receiving locations, and a plurality of said pressure connection terminals, which constitute load application side output terminals for said fuses, are disposed in a row at a second side of the respective row of fuse receiving locations distal from the other of said rows of fuse receiving locations.

9. A vehicle having an electrical junction box of claim 1.

* * * * *